Patented Sept. 29, 1953

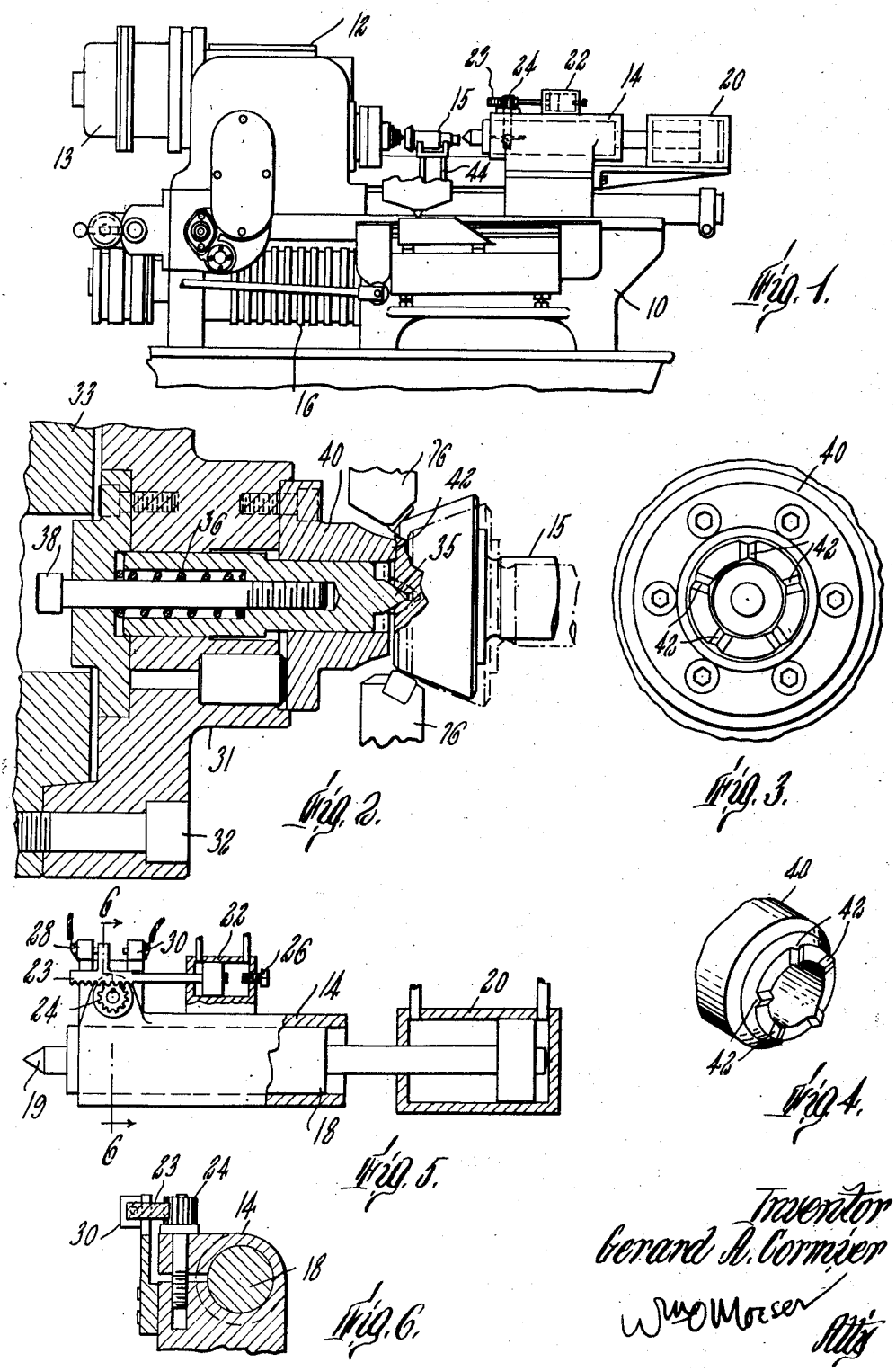

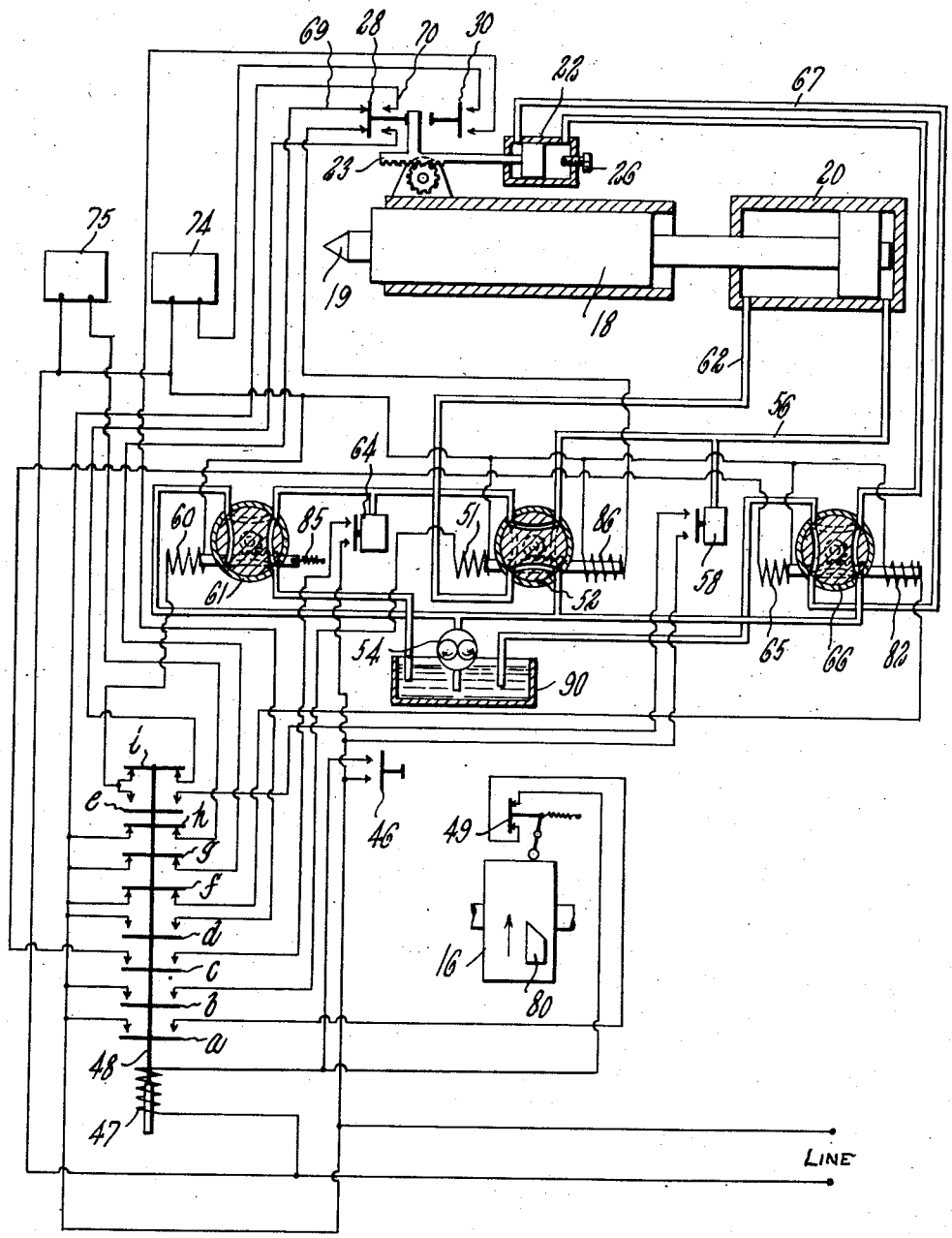

2,653,503

UNITED STATES PATENT OFFICE 2,653,503

AUTOMATIC MACHINE TOOL

Gerard A. Cormier, Springfield, Vt., assignor to Jones & Lamson Machine Company, Springfield, Vt., a corporation of Vermont Application August 15, 1949, Serial No. 110,427

1 Claim. (Cl. 82—31)

My invention relates to machine tools, and relates more particularly to such tools of the lathe type, and has for an object to provide a high production machine which is automatic in action during its entire cycle.

A further object of my invention is to provide a lathe having automatic sequential controls including novel means for positioning a workpiece in driving relation to the spindle on said lathe.

The foregoing and other objects and advantages of my invention will become readily apparent from the following detailed description and the accompanying drawings in which:

Figure 1 is a general view in elevation showing a lathe incorporating in the invention;

Figure 2 is a view in cross section showing in detail the driving fixture employed on the spindle of the lathe of Figure 1;

Figure 3 is an end view of the driving fixture;

Figure 4 is a view in perspective of the driving fixture;

Figure 5 is a view, partially schematic, of the tailstock employed on the lathe of Figure 1, including hydraulic means for advancing and binding said tailstock;

Figure 6 is a view in cross section taken on the lines 6—6 of Figure 5; and

Figure 7 is a schematic diagram of the hydraulic and electrical components and circuits for controlling the sequential operation of the machine cycle.

Referring now to the drawings, in which like reference characters denote like parts, and particularly to Figure 1, a lathe is shown having a bed 10 upon which is mounted a headstock 12, driven by a suitable motor 13, and a tailstock 14, between which a workpiece 15 is rotatably held for machining operations thereon. The lathe of Figure 1 may be of the general type described in U. S. Patent No. 2,061,311 to Lovely, in which a cam drum 16 rotating in timed relation to the spindle governs the motion of tools, which engage the workpiece as it is rotated by the spindle. The present invention is concerned primarily with an improved method of locating and driving the workpiece which eliminates the necessity of chucking the work as is the usual practice.

The tailstock 14 has a slidable ram 18 which carries a work engaging center 19 at its forward end. A hydraulic motor 20 is adapted to advance and return the ram 18 as hereinafter explained. A second hydraulic motor 22 is mounted on the tailstock 14 and is adapted to operate a binder by means of a rack 23 and a pinion 24. The action of the binder is clearly shown in Figure 6. The purpose of the binder is to secure the slidable ram 18 in a predetermined position during the machining of the workpiece. The degree of firmness of the binding action may be regulated as desired by an adjustable stop 26 against which the piston of the hydraulic motor 22 is held at the end of the binding stroke. At the ends of the binding and unbinding strokes, an extension on the rack 23 actuates a pair of electrical switches 28 and 30 which operate in the sequential circuit of Figure 7, as will hereinafter be explained.

The driving fixture shown in Figure 2 comprises a circular element 31 which may be secured as by bolts 32 to a rotatable spindle face 33 of the lathe. A work engaging center 35 is slidable within a bore in the element 31, and is normally biased toward the tailstock center by a spring 36. An adjustable threaded stop 38 is provided to limit the amount that the center 35 protrudes from the fixture when in the work receiving position. Secured to the element 31 is a work engaging piece 40 carrying a plurality of hardened lugs 42. I have chosen to illustrate five lugs, but any number may be employed depending on the nature of the machining to be done on the workpiece. I employ lugs having an included angle of ninety degrees and presented symmetrically to the workpiece, but other configurations may be used depending largely on the material comprising the workpiece and the degree of penetration permissible or desired.

The operation of my invention will be explained with particular reference to the circuit diagrams of Figure 7. The operator, after setting up the machine with proper tools for the particular piece to be turned, places the workpiece 15 on a cradle 44. The work rests on the cradle such that its axis is slightly lower than the line between centers 19 and 35. The workpiece has been prepared with centering holes on both ends as is well understood in the art. The loading action consists of the tailstock center advancing, and pushing the workpiece, first onto the center 35, and then further with a high degree of force to thereby imbed the lugs 42 into the driving end of the work. This is accomplished as follows:

Upon pressing the cycle start control switch 46, the solenoid 47 is energized, thereby raising the master switch 48 and closing contacts a, b, c, d, and e, and opening contacts f, g, h, and i. A holding circuit through a cycle stop switch 49 (normally closed) is completed by contact (a)

to hold the master switch in the raised, or "on" position.

A solenoid 51 is immediately energized through contact b and moves a directional hydraulic valve 52 to the dotted position. Fluid under pressure from a constant pressure source 54 is thus permitted to enter the fluid motor 20 through the line 56. The tailstock center 19 is thereby moved forcibly to the left, and the action of the two centers 19 and 35 is such as to lift the workpiece slightly from the cradle 44. The center 19 then continues to the left under pressure and drives the workpiece against the lugs 42.

When the pressure in line 56 has reached a predetermined high value, sufficient to imbed the lugs 42 securely into the end of the workpiece, a pressure switch 58 is actuated, closing the contacts shown at 58 on the electrical circuit. The switch may be of the spring loaded piston type, a Bourdon tube, or other device adapted to actuate electrical contactors at a predetermined pressure. I have found a pressure of 14,000 pounds sufficient in a given instance to drive the lugs into the workpiece, although this value of course may vary widely with different types of work.

Upon closure of switch 58, the solenoid 60 is energized through contact e on the master switch. This action places a directional hydraulic valve 61 in the dotted position, thereby connecting the line 62 to pressure through valves 52 and 61, both now in the dotted position. Thus pressure appears on both sides of the hydraulic motor 20. Due to the differential area of the two sides of the piston, there remains a resultant end pressure against the workpiece which is less than the imbedding force, and yet sufficient to hold the workpiece securely against the driving fixture. The spring loaded retracting center 35 insures that the workpiece is properly lifted from the cradle 44 and centered before the imbedding of the lugs. It is desirable to reduce the end pressure on the spindle bearings during rotation thereof. While I have taken advantage of the differential areas to reduce the end force on the workpiece, it would be convenient in some instances to employ adjustable pressure reducing valves in the lines to either or both sides of the motor 20, thus giving a wider latitude of adjustment in the value between the imbedding force and the operating force.

When the pressure in line 62 has developed as desired, a pressure switch 64 actuates contacts shown at 64 on the electrical circuit. This action actuates a solenoid 65 through contact c on the master switch, and places a directional hydraulic valve 66 in the dotted position. Fluid under pressure from the source 54 through a line 67 is thereby permitted to drive the hydraulic motor 22 to the left to bind the ram 18 securely in place. The binding action takes place as described in connection with Figures 5 and 6.

The binding motion of the rack 23 causes the double throw switch 28 to shift from contacts 69 to 70 and closes switch 30. Closure of the switch 30 actuates the spindle clutch 74 through a circuit including contactor d of the master switch. The spindle in the headstock of the lathe is thereby started and the machining operations on the workpiece are performed in accordance with a tool cycle controlled by a cam drum 16 as described in the aforementioned patent to Lovely.

A pair of tools 76 are shown at the finish of their respective cuts to show that with the method of driving the workpiece shown, it is possible to perform machining operations at the extremities of the workpiece without interference of chuck jaws, driving dogs or the like.

At the end of the tooling cycle a cycle stop cam 80 opens switch 49, thereby breaking the holding circuit to solenoid 47. On the master switch 48 the contacts a, b, c, d, and e then open, and the contacts f, g, h, and i close. The contact i maintains energization of solenoid 60 through contacts 70 which were closed when the binding action of the rack 23 occurred. Solenoid 82 is energized through contact f, returning the valve 66 to the full line position. This permits return of the hydraulic motor 22 to the left to unbind the ram 18. The circuit to the spindle clutch 74 is broken first at contact d, and the spindle brake circuit is applied through contact h. The switch 30 is opened by the unbinding action of the rack 23 to break the clutch circuit in such a manner that the contact d cannot re-energize the clutch on the succeeding cycle until the ram 18 has been bound in operative position. When the rack 23 has released the ram, the double throw switch opens contacts 70 and closes contacts 69. Solenoid 60 is thereby de-energized by opening of contacts 70, and a spring 85 returns the valve 61 to the full line position. Closure of contacts 69 energize a solenoid 86 which returns the valve 52 to the full line position. Pressure is thereby applied through the line 62 to the motor 20, and the line 56 leads through valves 52 and 61 to the reservoir 90. In this position of the valves 52 and 61, the ram 18 is returned to the right, thus releasing the finished workpiece; the spring loaded center 35 then pushes the workpiece off the lugs 42 and the operator may then lift the workpiece from the cradle 44 and replace it with a rough piece in preparation for the next cycle. The pressure in lines 56 is relieved, thus opening the pressure controlled contacts 58 and 64 in preparation for the next cycle.

It will be appreciated from the foregoing that I have provided an automatic sequential cycle for performing a complete machining operation. The spindle of the lathe is set in rotation by the spindle clutch only after the workpiece has been impressed onto the driving lugs on the spindle, the impressing force then reduced to a low value to reduce the end thrust on the bearings, and the tailstock ram securely bound in place. In some instances I have found it advantageous to bind the ram 18 lightly; that is, with sufficient force to take up any looseness, and yet to permit forward take-up against the workpiece should any play develop between centers during heavy cutting action of the tools. For this reason I provide the adjustable stop 26 on the ram binding hydraulic motor 22.

Where precise endwise location of the workpiece is not required, the degree of penetration of the lugs 42 is not critical. Where precise endwise location is desired, I prefer to employ lugs which permit penetration until the workpiece abuts the body portion 40 of the driving fixture. Endwise location with respect to the position and cutting path of the tools is thereby assured.

In the embodiment described I depend on the lifting action of the centers to clear the cradle 44. If greater clearance is desired, for example, in a particular tooling set up, the cradle may be made retractable, the retracting motion can be provided at any suitable point in the loading sequence, after the tailstock center has advanced and picked up the workpiece.

While I have described a preferred embodiment of my invention, it will be apparent from the foregoing description that numerous modifications within the spirit and scope of my invention as expressed in the appended claim may occur to persons skilled in the art.

I claim:

In a machine tool of the class described comprising a bed, a headstock on said bed, a spindle journaled in said headstock, a tailstock including a work supporting center on said bed in alignment with said spindle, a differential hydraulic piston and cylinder on said tailstock, means for applying fluid pressure to the side of greater area in said cylinder to advance said center with force toward said spindle, and means for applying an equal pressure to the other side of said cylinder and maintaining said pressures simultaneously on both sides of said piston to reduce the amount of said force.

GERARD A. CORMIER.

References Cited in the file of this patent

UNITED STATES PATENTS

| Number | Name | Date |
|---|---|---|
| 568,551 | Vierengel | Sept. 29, 1896 |
| 1,401,131 | Blackburn | Dec. 27, 1921 |
| 1,464,415 | Fontana | Aug. 7, 1923 |
| 1,582,639 | Cullen | Apr. 27, 1926 |
| 1,905,133 | Bishop et al. | Apr. 25, 1933 |
| 2,061,311 | Lovely | Nov. 17, 1936 |
| 2,131,327 | Lippard | Apr. 27, 1938 |
| 2,194,391 | Ingalsbe | Mar. 19, 1940 |
| 2,333,055 | Terrell | Oct. 26, 1943 |
| 2,352,726 | Maulding | July 4, 1944 |
| 2,389,746 | Sparks | Nov. 27, 1945 |
| 2,441,925 | Wege | May 18, 1948 |
| 2,545,858 | Pesqueira | Mar. 20, 1951 |